(12) United States Patent
Parnell et al.

(10) Patent No.: US 7,017,961 B1
(45) Date of Patent: Mar. 28, 2006

(54) COMPRESSIVE END EFFECTOR

(75) Inventors: Geoffrey Parnell, Moseley, VA (US); Paul Boyd, Midlothian, VA (US); Lee Robinson, Ruther Glen, VA (US); Tom Pearce, Ruther Glen, VA (US)

(73) Assignee: Bakery Holdings LLC, Richmond, VA (US)

( * ) Notice: Subject to any disclaimer, the term of this patent is extended or adjusted under 35 U.S.C. 154(b) by 0 days.

(21) Appl. No.: 10/914,004

(22) Filed: Aug. 6, 2004

(51) Int. Cl.
*B25J 15/06* (2006.01)

(52) U.S. Cl. .............................. 294/2; 294/64.1; 901/40
(58) Field of Classification Search .................... 294/2, 294/64.1, 65; 414/627, 737, 752.1; 901/40; 251/61, 61.2, 63.5
See application file for complete search history.

(56) References Cited

U.S. PATENT DOCUMENTS

| | | | | |
|---|---|---|---|---|
| 4,078,671 A | * | 3/1978 | Lundstrom | 414/627 |
| 4,355,936 A | * | 10/1982 | Thomas et al. | 414/796.2 |
| 4,787,812 A | * | 11/1988 | Gopfert | 414/737 |
| 4,850,627 A | * | 7/1989 | Franklin | 294/2 |
| 5,024,575 A | * | 6/1991 | Anderson | 414/627 |
| 5,088,878 A | * | 2/1992 | Focke et al. | 414/627 |
| 5,752,729 A | * | 5/1998 | Crozier et al. | 294/2 |
| 5,813,713 A | * | 9/1998 | Van Den Bergh | 294/65 |

\* cited by examiner

*Primary Examiner*—Dean J. Kramer

(57) ABSTRACT

Apparatus and method for holding an uncompressed bundle of product from the top with a vacuum assisted end effector and then simultaneously compressing the bundle from all sides at the same time with thin compression plates located about the periphery of a vacuum assisted end effector to form an evenly compressed product bundle that is then placed in a container with the compression plates between the product and the container walls. Once the bundle is received in the container, vacuum is removed; the inward force of the compression plates released and the compression plates removed vertically from between the product and the containers walls. The simultaneous compression from all sides provides even distribution of forces on the product and ensures that all product is compressed or deformed to the same degree. Using the apparatus described herein to place the bottom of the products gently onto the inside bottom of the container is further advantageous.

2 Claims, 5 Drawing Sheets

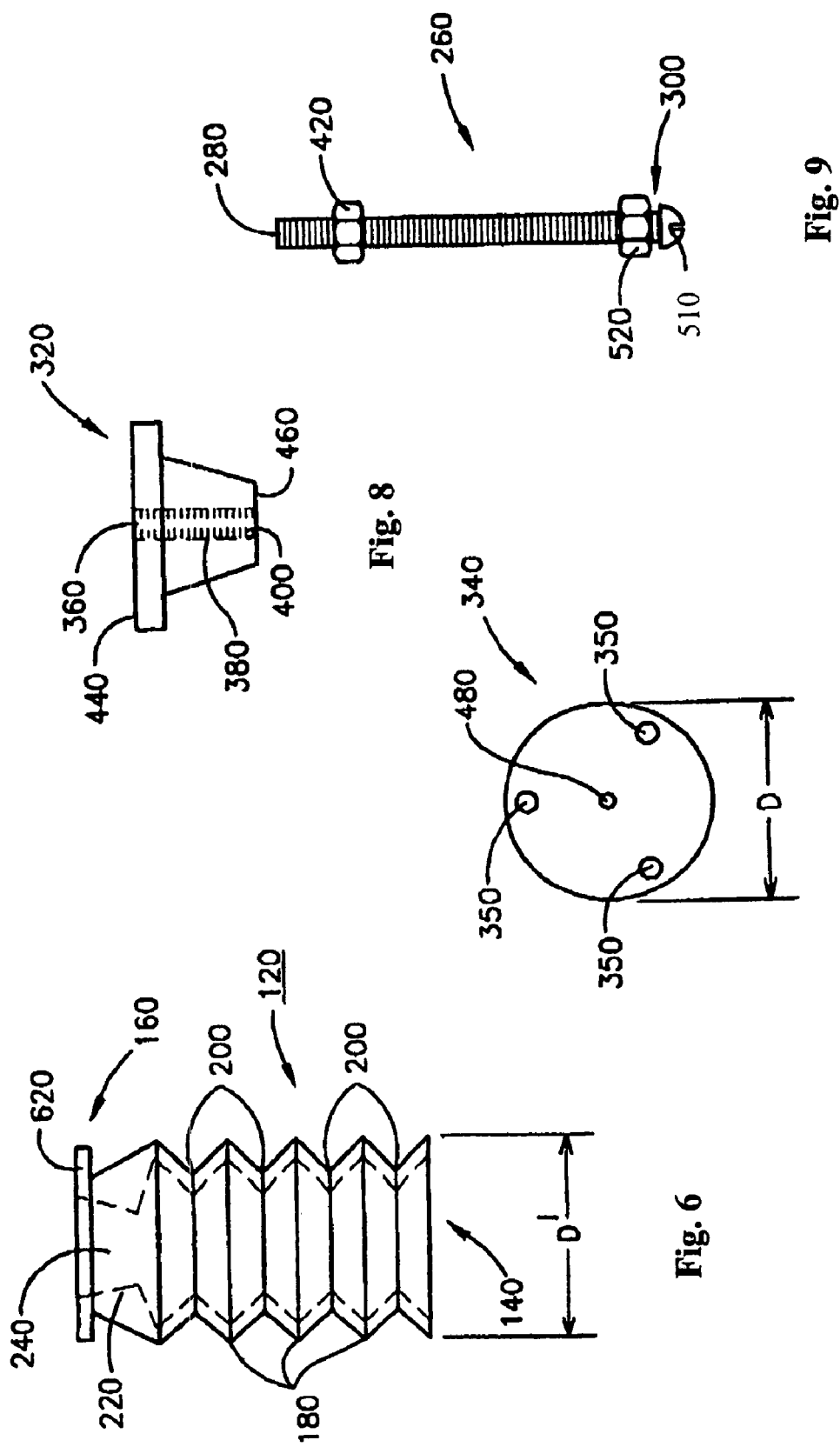

COMPRESSIVE END EFFECTOR

FIELD OF THE INVENTION

The present invention relates to robotic end effectors for picking products and more particularly to a rotating end effector including peripheral compressive plates that compact product picked by the end effector.

BACKGROUND OF THE INVENTION

The use of vacuum assisted picking end effectors to achieve the movement of product is quite common in robotic packaging operations. In many of these automated packaging operations the product being packaged must be assembled into a bundle on the end effector prior to insertion into a suitable container or basket. Such is particularly the case in the packaging of, for example, bakery products or the like, where a bundle of bread loaves or the like are assembled on an end effector and then inserted into a delivery basket or container.

Such a problem is particularly acute in those applications wherein it is required that all of the products designated as a full layer in a container or basket (such as the bread loaves shown in FIGS. 1 and 2 wherein bread loaves 10 are packaged in shipping container or basket 12) be squeezed into conformance and forced into the container. One prior art approach to this task was to place the product into the container one at a time and then to force the last few in each direction into the container. This often is undesirable because each object may be squeezed differently from the others in the basket or container. If all the products are pushed away to make room for an "un-squeezed" last object, then they are squeezed to different degrees which is similarly undesirable. If the last product is squeezed into the remaining space left over after all the un-squeezed objects are in place, then the last object is squeezed to a different degree which is again undesirable. The best way to accomplish the task of squeezing all the products into the basket or container is to form the group of products in the proper pattern and orientation and to squeeze from all sides inward at the same time until all products conform to the containers shape and then to set the objects into the container. This has been accomplished in various ways in the prior art. One method was to: 1) squeeze the product in the X direction; 2) insert the group into the container at an angle such that the first row is near and below the top of a Y direction container wall; 3) push from the other Y direction end of the product and force the objects up against the container wall until the trailing products are past the opposite Y direction wall; and 4) drop all of the thus compressed product into the container. Another method is to loosely arrange the objects on a bottom support overtop of the container (by mechanical or robotic means), to compress in all sides of the objects until they are slightly smaller than the container walls, and then to quickly remove the bottom support of the products and let them fall into the container. The problem with this method is that the product often expands or springs out as it falls and sometimes hangs up and does not drop all the way into the container. Another problem with this method is that the product has to drop—which can result in damage thereto. If the product(s) have to be picked with vacuum from the top and temporarily supported in their descent then this is expensive and usually prevents the use of a robot to form the pattern.

Thus, it is apparent that there exists a need for an apparatus, most desirably an end effector that is capable of forming a required bundle of product, compressing the bundle and then inserting the bundle into a shipping container or basket in the compressed form thereby assuring that all individual product objects are uniformly compressed and no damage is imparted to the product during insertion into the shipping container or basket.

OBJECT OF THE INVENTION

It is therefore an object of the present invention to provide apparatus that is capable of picking a product to form a product bundle, compressing said product bundle uniformly from all sides and placing the bundle into a shipping container or the like without damage to the product.

It is another object of the present invention to provide such an apparatus that operates as an end effector for the picking and placement of product.

SUMMARY OF THE INVENTION

According to the present invention an uncompressed pattern of product is loosely held from the top with vacuum and then simultaneously compressed from all sides at the same time with thin compression plates located about the periphery of a vacuum assisted end effector to form an evenly compressed bundle that is then placed in the container with the compression plates between the product and the container walls. The vacuum is then removed; the inward force of the compression plates released and the compression plates removed vertically from between the product and the containers walls. The simultaneous compression from all sides provides even distribution of forces on the product and ensures that all product is compressed or deformed to the same degree. Using the apparatus described herein to place the bottom of the products gently onto the inside bottom of the container is further advantageous.

DESCRIPTION OF THE DRAWINGS

FIG. 6 is a partially phantom side view of the suction cup portion of the contact activated vacuum assisted suction cup assembly of the present invention.

FIG. 7 is a bottom view of the valve plate portion of the contact activated vacuum assisted suction cup assembly of the present invention.

FIG. 8 is a partially phantom side view of the valve stop portion of the contact activated vacuum assisted suction cup assembly of the present invention.

FIG. 9 is a side view of one embodiment of the valve stem portion of the contact activated vacuum assisted suction cup assembly of the present invention

DETAILED DESCRIPTION

According to the present invention an uncompressed bundle of product is loosely held from the top with vacuum and at the end of an end effector is simultaneously compressed from all sides at the same time with thin compression plates located about the outer periphery of a vacuum assisted end effector to form an evenly compressed bundle that can then placed in the container with the compression plates between the product and the container walls. The vacuum is then removed; the inward force of the compression plates released and the compression plates removed vertically from between the product and the containers walls. The simultaneous compression from all sides provides even distribution of forces on the product and ensures that all products are compressed or deformed to the same degree. Using the apparatus described herein to place the bottom of the products gently onto the inside bottom of the container is further advantageous.

Figure 1:
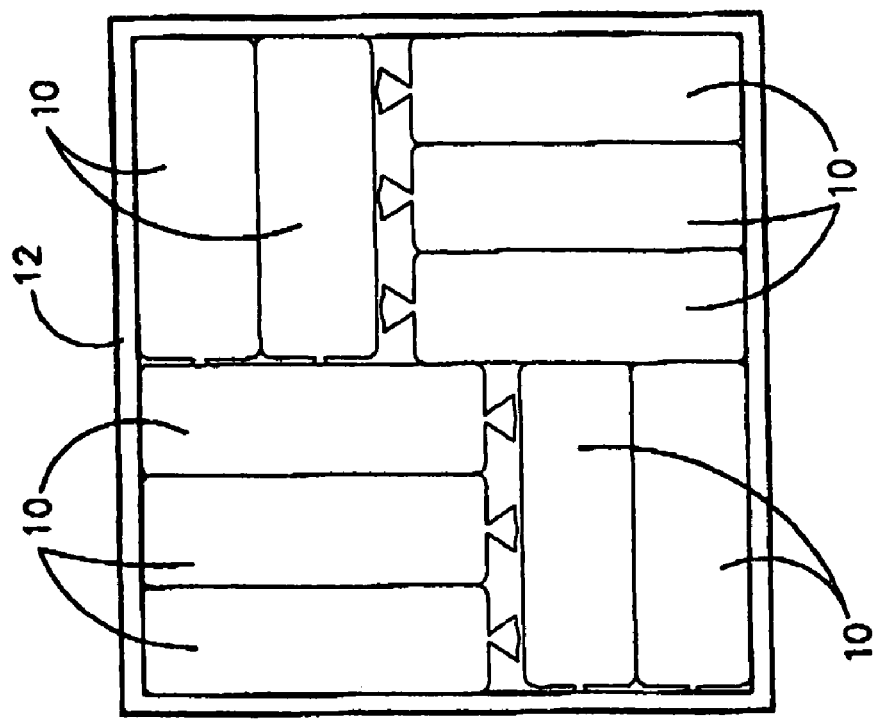
FIGS. 1 and 2 depict different product orientations in a shipping container that can be compressed using the apparatus and method of the present invention.
Figure 2:
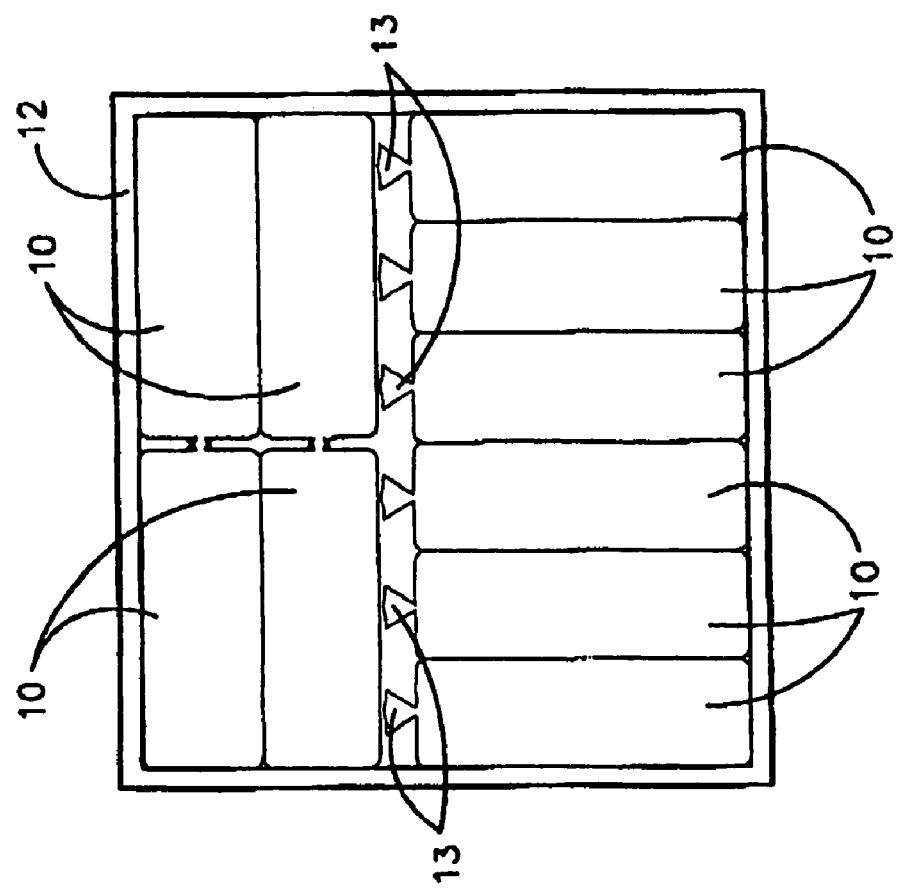
Figure 3:
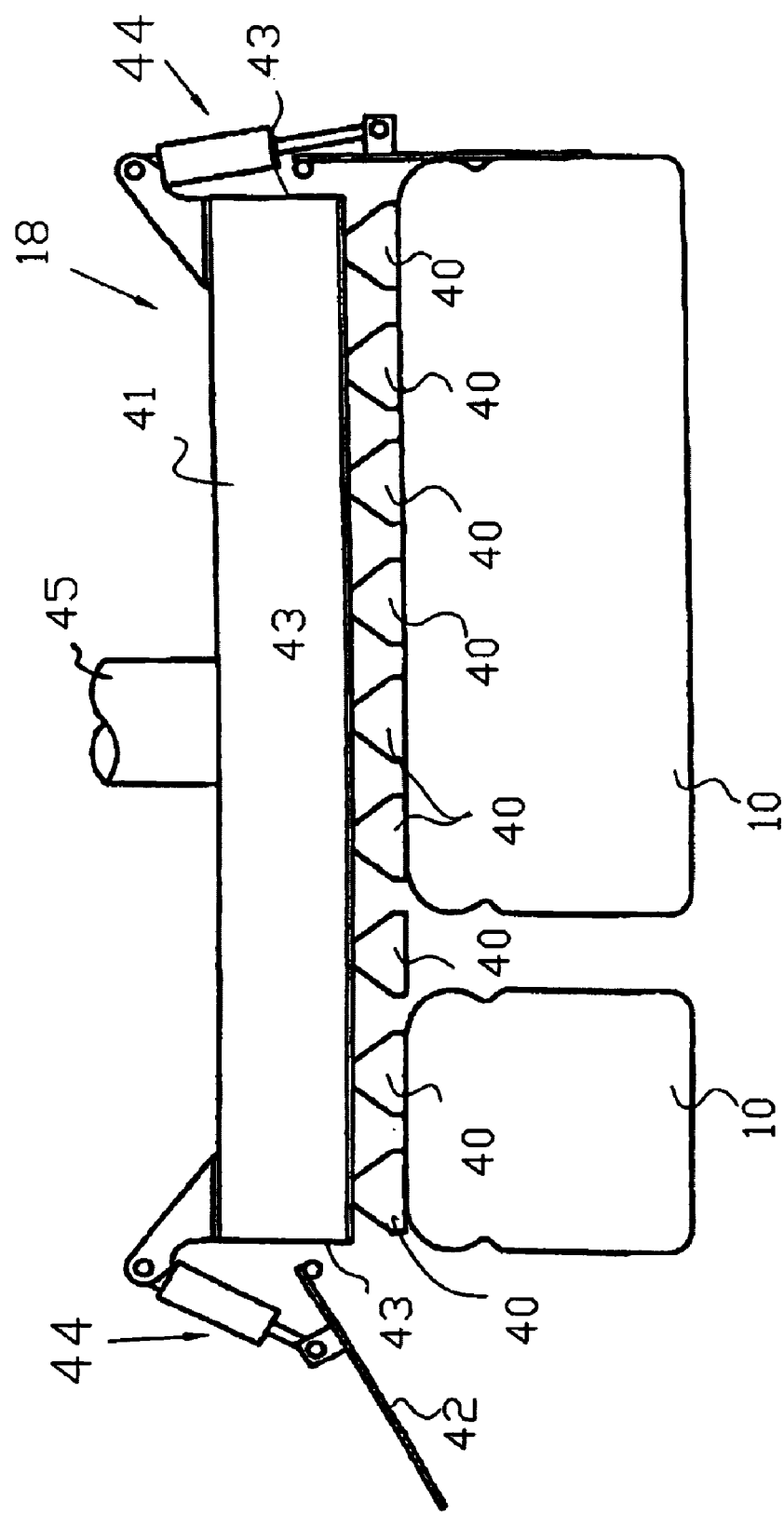
FIG. 3 is a schematic side view of the compressive plate equipped end effector of the present invention.

Referring now to FIG. 3 that depicts a schematic side view of a preferred embodiment of the end effector 18 of the present invention, loaves 10 are held to end effector 18 through the action of suction cups 40. End effector 18 includes a vacuum plenum 41 as well as a vacuum inlet 45. Of particular interest in FIG. 3 are compression plates 42 that are hydraulically (or otherwise, i.e. electrically, mechanically, etc) actuated by hydraulic cylinder assembly 44. While in the depiction presented in FIG. 3, for clarity, only two compression plates 42 are shown, it will be readily apparent to the skilled artisan that such compression plates 42 are located on all sides, i.e. about the outer periphery or outer peripheral edge 43 of end effector 18 to provide uniform and preferably simultaneous compression from all sides of the bundle of loaves attached to end effector 18. During picking of product 10 all of compression plates 42 are in the position indicated at the left of FIG. 3. Upon completion of picking of a unit or bundle of product 10 for insertion into container or basket 12 (see FIGS. 1 and 2) all peripheral compression plates 42 are activated simultaneously through the action of hydraulic cylinders 44 and rotate downward to the position indicated at the right of FIG. 3 thereby uniformly compressing product 10 into a product bundle suitable for insertion into container or basket 12. Once insertion into container or basket 12 is complete, end effector 18 is raised through the action of gantry (not shown in the Drawings) and compression plates 42 again raised, i.e. rotated upward, to the position shown at the left of FIG. 3 preparatory to another pick of product 10.

While any suitable arrangement of suction cups 40 supplied with a suitable vacuum via plenum 41 on end effector 18 can be used successfully, an end effector that provides "on demand" vacuum due to the presence of product 10 under a specified suction cup 40 or array of suction cups 40 is specifically preferred. Such a vacuum system is referred to herein as a "contact activated vacuum assisted suction cup" and is described below.

Referring now to FIGS. 4 and 6–9, the preferred contact activated vacuum assisted suction cup assembly 100 of the present invention comprises a corrugated or bellowed cup 120 comprising an open end 140 and a valve end 160. Corrugated cup 120 further includes coaxial large diameter areas 180 and small diameter areas 200 defined by the interconnected corrugations or "bellowed" configuration of bellowed cup 120.

At the valve end 160 of bellowed cup 120 is a valve seat 220 (best seen in FIGS. 4 and 6) that closes valve end 160 except at the aperture 240 in valve seat 220. Valve end 120 also incorporates a peripheral and preferably integral flange 620 whose purpose is the engagement of apertures in a plenum 540 as described below.

Figure 4:
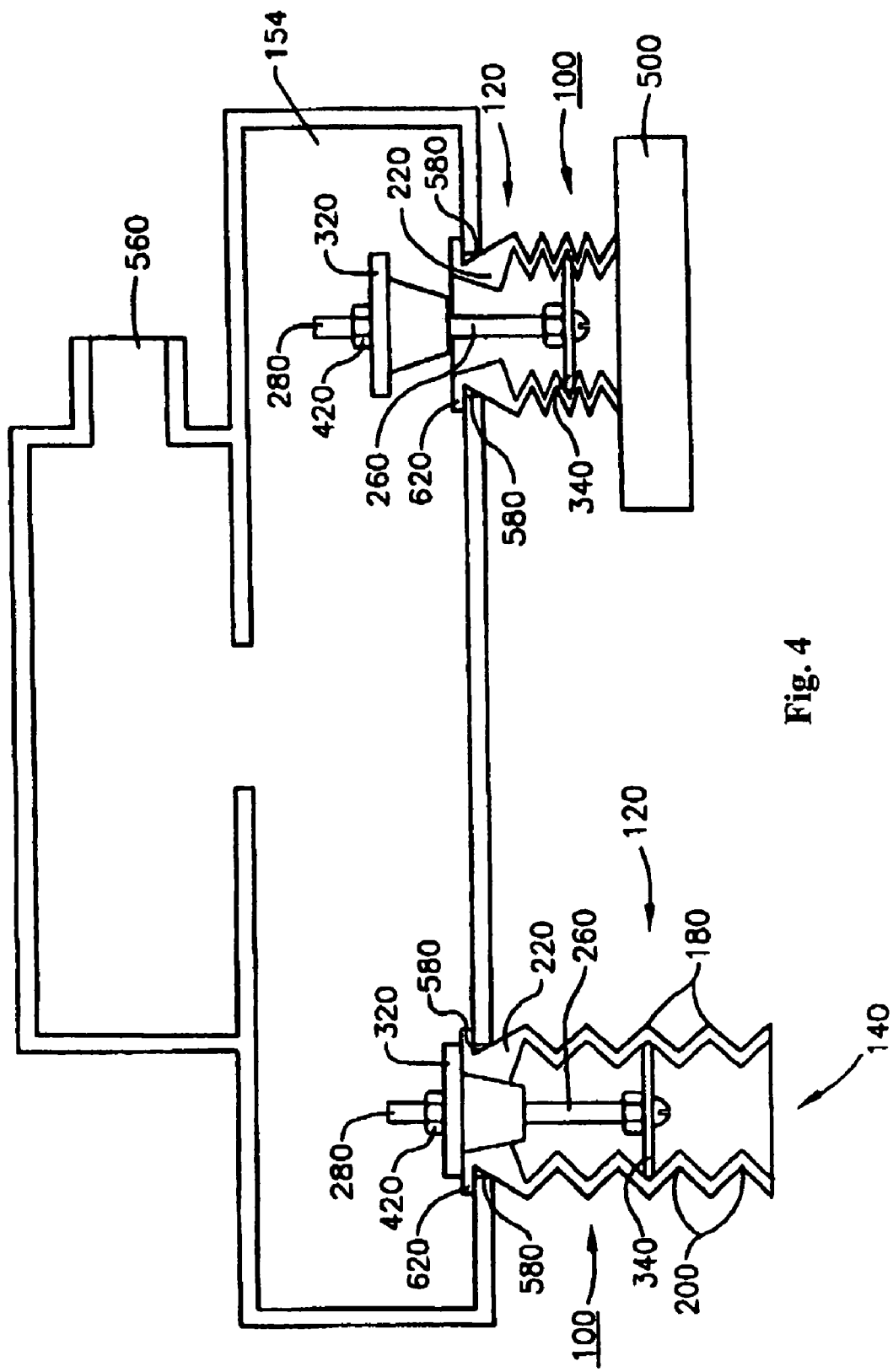
FIG. 4 is a schematic partially cut-away side view of a portion of a picking system in accordance with the present invention showing the structure of the contact activated vacuum assisted suction cup assembly of the present invention in each of the open and closed positions.

Inserted through aperture 240 is valve stem 260 (best seen in FIGS. 4 and 9). As depicted on the attached drawings, valve stem 260 comprises a simple bolt, however it will be readily appreciated that more sophisticated custom machined, welded etc. structures could be substituted for this simple design. Valve stem 260 has a first extremity 280 and a second extremity 300. Attached to first extremity 280 in the accompanying Figures is a valve stop 320 (best seen in FIGS. 4 and 8) and attached to the second extremity 300 is a valve plate 340 (best seen in FIGS. 4 and 7). Attachment of valve stop 320 to valve stem 260 is accomplished by the simple expedient of inserting valve stem 260 through aperture 360 in valve stop 320. Valve stop 320 may be located on valve stem 260 by, for example providing threads 400 on the inner surface 380 of valve stop 320 as shown, or by simply securing valve stop 320 with a nut 420 on both the upper and lower surfaces 440 and 460 of valve stop 320. In the embodiment depicted in the accompanying Figures, valve stop 320 is threaded onto valve stem 260 and nut 420 is used to secure it in position. Quite obviously, valve seat 220 and valve stop 320 must be of relative sizes as to seal aperture 240 when valve assembly 100 is in the closed position depicted at the left in FIG. 4.

As will be apparent to the skilled artisan, valve stop 320 and valve seat 220 should be fabricated from a material or materials that allow for tight sealing therebetween upon contact of these two elements of the assembly of the present invention as shown at the left in FIG. 4. Thus, rubber or polymeric materials that provide such sealing should be used. Alternatively, a coating of a suitable such material can be applied over a "non-sealing" metallic or polymeric structure to provide the appropriate sealing effect.

At the opposing extremity of valve stem 260, valve plate 340 is attached to valve stem 260 by the insertion of valve stem 260 through aperture 480 at the approximate center of valve plate 340 and securing it in position between the head 510 of valve stem 280 with nut 520. As best seen in FIG. 4, valve plate 340 is of a diameter D (see FIG. 7) that is of approximately the same as or, slightly larger than diameter D' of large diameter areas 180 (see FIG. 4) so that it can be inserted into one of large diameter areas 180 intermediate valve end 160 and open end 140. In this configuration, valve plate 340 will remain in position in corrugated cup 120 even when an individual assembly 100 is not in use. Apertures 350 are provided in valve plate 340 to permit a vacuum to be drawn through valve plate 340 upon contact of open end 140 with an object to be lifted 500 as explained more fully below.

While valve stop 320 and valve plate 340 are described herein as being located at "the extremities 280 and 200 of valve stem 260, it will be apparent to the skilled artisan that the term extremity as used in this context is meant to indicate at or near the opposing ends of valve stem 260 and not necessarily at the very end thereof.

Depicted schematically in FIG. 4, is a plenum 540 having a vacuum inlet 560. Apertures 580 in plenum 540 engage valve end 160 of corrugated cup 120 through the engagement of peripheral flange 620 with the periphery of aperture 580. As shown at the left of FIG. 4, when no object to be lifted is present, corrugated cup 120 remains in its fully extended position, valve stem 260 with attached valve stop 320 remains in it fully lowered position, valve stop 320 engages valve seat 220 and no vacuum can pass through valve end 160. Thus, if no product 500 contacts open end 140, no vacuum is allowed to escape through the vacuum cup assembly 100 of the present invention and only those assemblies 100 whose open ends 140 are contacted by product 500 are activated as described below. Upon contact of open end 140 with an object to be lifted 500, corrugated cup 120 collapses upward as shown at the right of FIG. 4 due to upward pressure applied to open end 140 against object 500 by downward movement of plenum 540, or if desired by design, upward movement of product 500. In the case depicted at the right, upon the application of upward pressure to corrugated cup 120 (for the reason just described), valve stem 260 is also caused to travel upward resulting in the disengagement of attached valve stop 320 with valve seat 220 thereby allowing vacuum from plenum 540 to pass through apertures 350 to tighten the "grip" of corrugated cup 120 on object 500.

Figure 5:
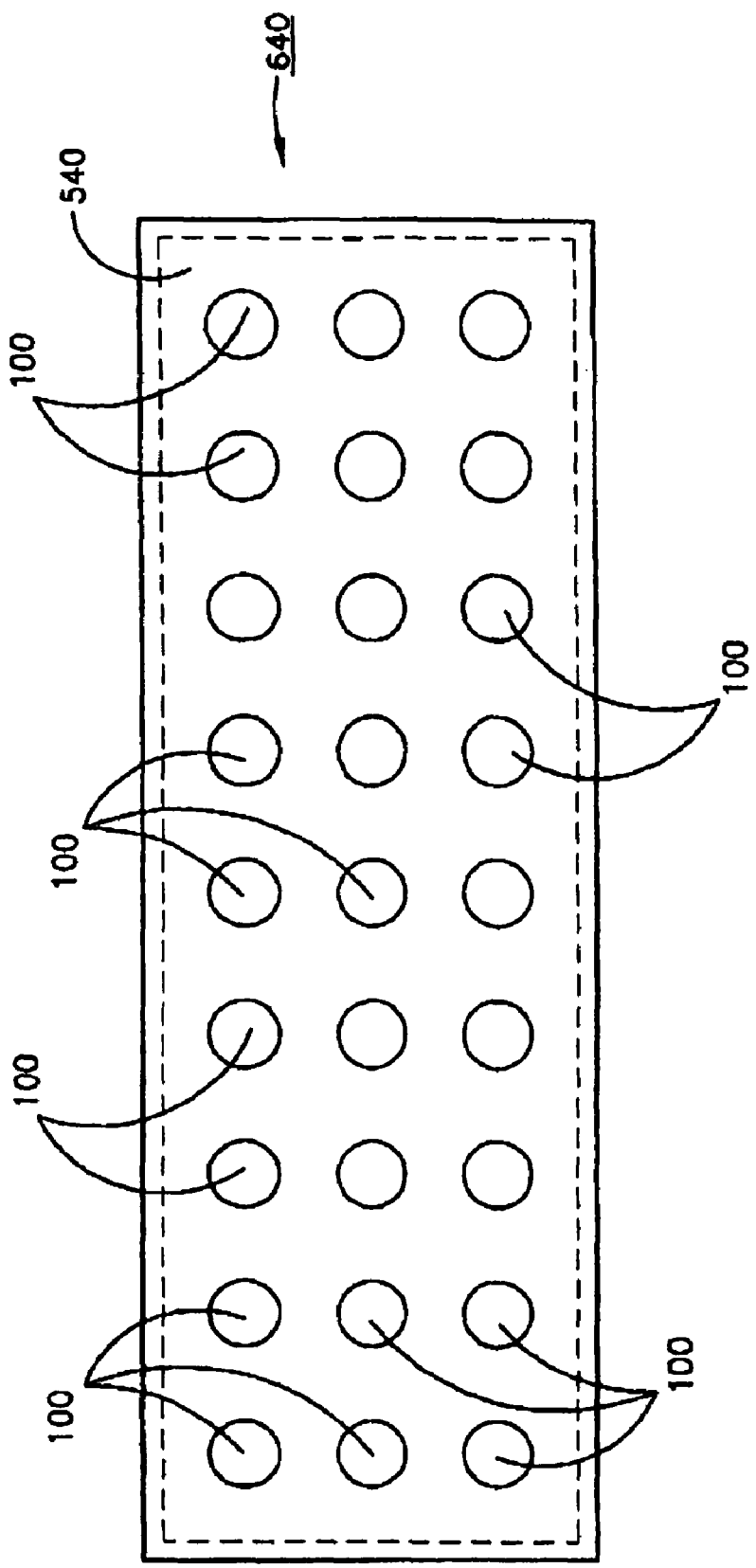
FIG. 5 is a schematic view the vacuum portion of a vacuum assisted end effector in accordance with the present invention.

Depicted schematically in FIG. 5 is a bottom views of a picking device 640 comprising a plenum 540 having an array of contact activated vacuum assisted suction cup assemblies 100 mounted therein. As just described, such a picking device 640 can be used to pick up and move any arrangement of sizes of objects to be lifted 500 without concern for which of the individual contact activated vacuum assisted suction cup assemblies 100 lies in registration therewith, since those assemblies not in contact with one or more of contact activated vacuum assisted suction cup assemblies 100 will not result in the leakage or loss of vacuum due to the closed condition of valve end 160. Thus the need to add "chambering" (as was done in the prior art) or refitting of the picking array when different product is being picked is obviated.

There as thus been described a novel end effector incorporating peripheral compression plates that uniformly compress a bundle of products attached to the end effector through the action of vacuum assisted suction cups. Such an apparatus provides the uniform bundle compression desired for inserting the bundle into a shipping container or basket in an undamaged fashion.

What is claimed is:

1. A robotic end effector for picking product and building a bundle of product retained thereon comprising:
   A) a rectangular vacuum assisted plenum having opposing outer peripheral edges comprising;
      i) a vacuum plenum fed by a vacuum inlet; plurality of plenum apertures in said vacuum plenum; and
      ii) in said plenum apertures, contact activated vacuum assisted suction cup assemblies comprising:
         a) a cylindrical bellowed or corrugated cup defining a plurality of interconnected bellows or corrugations of alternating, coaxial large and small diameter areas, said bellowed cup comprising;
            A) an open contact end; and
            B) a valve end including a valve seat and a peripheral flange for engagement with said plenum apertures;
      iii) a threaded articulatable valve stem having first and second extremities;
      iv) a valve plate intermediate said open contact end and said valve end in one of said large diameter areas attached to said first extremity and including apertures therein for the passage of a vacuum; and
      v) a valve stop threaded onto said valve stem at said second extremity said valve stop being of a size to engage said valve seat and including a central threaded aperture; and
      vi) compressive plates rotatably mounted along each of said outer peripheral edges;
said plurality of compressive plates being rotatable downward from said outer peripheral edges to compress a bundle of product retained on said vacuum assisted plenum.

2. The robotic end effector of claim 1 Wherein the peripheral flange is integral with said valve end.

* * * * *